United States Patent
Schneider

(10) Patent No.: US 8,358,781 B2
(45) Date of Patent: Jan. 22, 2013

(54) NONLINEAR FEEDBACK MODE FOR BLOCK CIPHERS

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 257 days.

(21) Appl. No.: 12/325,228

(22) Filed: Nov. 30, 2008

(65) Prior Publication Data

US 2010/0135486 A1  Jun. 3, 2010

(51) Int. Cl.
*H04L 29/06* (2006.01)

(52) U.S. Cl. ......................................................... 380/46

(58) Field of Classification Search ................... 380/46
See application file for complete search history.

(56) References Cited

U.S. PATENT DOCUMENTS

| | | | | |
|---|---|---|---|---|
| 4,157,454 A | * | 6/1979 | Becker | 380/37 |
| 5,003,597 A | | 3/1991 | Merkle | |
| 5,214,703 A | | 5/1993 | Massey et al. | |
| 5,619,576 A | * | 4/1997 | Shaw | 380/44 |
| 5,724,428 A | * | 3/1998 | Rivest | 380/37 |
| 5,799,088 A | | 8/1998 | Raike | |
| 6,061,449 A | | 5/2000 | Candelore et al. | |
| 6,122,379 A | * | 9/2000 | Barbir | 380/269 |
| 6,247,112 B1 | | 6/2001 | Seki | |
| 6,523,114 B1 | | 2/2003 | Barton | |
| 6,560,338 B1 | | 5/2003 | Rose | |
| 6,999,588 B1 | | 2/2006 | Oishi | |
| 7,103,181 B2 | | 9/2006 | Ananth | |
| 7,263,540 B1 | | 8/2007 | Kuehnel | |
| 7,328,228 B2 | | 2/2008 | Klein et al. | |
| 7,795,899 B1 | | 9/2010 | Grohoski et al. | |
| 7,925,009 B2 | | 4/2011 | Schneider | |
| 7,945,049 B2 | | 5/2011 | Schneider | |
| 7,962,540 B2 | | 6/2011 | Michaels et al. | |
| 2001/0029608 A1 | | 10/2001 | Nagashima et al. | |
| 2001/0033656 A1 | | 10/2001 | Gligor et al. | |
| 2002/0054679 A1 | | 5/2002 | Vesely | |
| 2002/0124033 A1 | | 9/2002 | Takahashi | |
| 2002/0136406 A1 | | 9/2002 | Fitzhardinge et al. | |
| 2003/0048728 A1 | * | 3/2003 | Kuribayashi et al. | 369/59.24 |
| 2003/0048899 A1 | | 3/2003 | Spacey | |
| 2003/0059040 A1 | | 3/2003 | Rose et al. | |
| 2003/0217268 A1 | | 11/2003 | Gantman | |
| 2004/0120518 A1 | | 6/2004 | Macy et al. | |
| 2005/0097153 A1 | | 5/2005 | Dirscherl et al. | |

(Continued)

OTHER PUBLICATIONS

Tan. The PLFG parallel pseudorandom number generator Feb. 2002 pp. 693-698. Future generation computer systems vol. 18 issue 5.*

(Continued)

*Primary Examiner* — Farid Homayounmehr
*Assistant Examiner* — Lisa Lewis
(74) *Attorney, Agent, or Firm* — Lowenstein Sandler PC

(57) ABSTRACT

Plain text, a secret key and a primitive polynomial that defines a finite field of even characteristic are received. The plain text is divided into a plurality of plain text blocks. For each plain text block of the plurality of plain text blocks other than a first plain text block, the plain text block is multiplied by a preceding cipher text block over the finite field of even characteristic, modulo the primitive polynomial, to generate an intermediate block, wherein the preceding cipher text block was generated from a preceding plain text block. Each intermediate block is processed by a block cipher using the secret key to generate a subsequent cipher text block. The block cipher operates in a nonlinear feedback mode of operation.

27 Claims, 8 Drawing Sheets

U.S. PATENT DOCUMENTS

| | | | |
|---|---|---|---|
| 2005/0131961 A1* | 6/2005 | Margolus et al. | 707/200 |
| 2005/0177727 A1 | 8/2005 | Moskowitz et al. | |
| 2006/0126843 A1 | 6/2006 | Brickell et al. | |
| 2007/0076890 A1 | 4/2007 | Muresan et al. | |
| 2007/0237327 A1 | 10/2007 | Taylor et al. | |
| 2008/0069342 A1* | 3/2008 | Relyea | 380/30 |
| 2008/0109501 A1* | 5/2008 | Douguet et al. | 708/250 |
| 2008/0130876 A1 | 6/2008 | Etienne et al. | |
| 2008/0292096 A1 | 11/2008 | Schneider | |
| 2008/0298583 A1 | 12/2008 | Ahmed | |
| 2008/0307024 A1 | 12/2008 | Michaels et al. | |
| 2009/0060179 A1 | 3/2009 | Schneider | |
| 2009/0060180 A1 | 3/2009 | Schneider | |
| 2009/0195370 A1 | 8/2009 | Huffman et al. | |
| 2009/0214024 A1 | 8/2009 | Schneider | |
| 2009/0220083 A1 | 9/2009 | Schneider | |
| 2009/0279690 A1 | 11/2009 | Michaels et al. | |
| 2009/0292752 A1 | 11/2009 | Schneider | |
| 2010/0135486 A1 | 6/2010 | Schneider | |

OTHER PUBLICATIONS

RSA. "What is Cipher Block Chaining Mode?". Mar. 3, 2007 from Internet Archive WayBack Machine. http://web.archive.org/web/20070303121357/http://www.rsa.com/rsalabs/node.asp?id=2171.*

Barker, William C., "Recommendation for the Triple Data Encryption Algorithm (TDEA) Block Cipher", National Institute of Standards and Technology, Technology Administration U.S. Department of Commerce, Information Security, NIST Special Publication 800-67, Version 1.1, Revised May 19, 2008, (May 2004), 40 pages.

Bauer, Friedrich L., "8. Transposition Ciphers", Decrypted Secrets, 2nd edition, (2000), 16 pages.

Belal, Ahmed A., et al., "2D-Encryption Mode" Mar. 2001, 32 pages.

Bellare, M., et al., "A Conventional Authenticated-Encryption Mode" Submission to National Institute of Standards and Technology, Apr. 13, 2003, 14 page.

Bellare, M., et al., "The FFX Mode of Operation for Format-Preserving Encryption" Feb. 20, 2010, pages.

Black, John, et al., "A Suggestion for handling Arbitrary-Length Messages with the CBC MAC", Aug. 2001, 3 pages.

Brier, Eric, et al., "BPS: a Format-Preserving Encryption Proposal" 11 pages, Ingenico, France. Published at the following website Apr. 2010, http://csrc.nist.gov/groups/ST/toolkit/BCM/modes development.html.

Cohen, Bram, "AES-hash" May 2, 2001, 4 pages.

"Data Encryption Standard (DES)", FIPS PUB 46-2, Dec. 30, 1993, 16 pages, http://www.itl.nist.gov/fipspubs/fip46-2.htm.

"Data Encryption Standard (DES)", U.S. Department of Commerce/National Institute of Standards and Technology, FIPS PUB 46-3, Reaffirmed Oct. 25, 1999, 26 pages.

Dworkin, Morris, "Recommendation for Block Cipher Modes of Operation —Galois/Counter Mode (GCM) and GMAC" National Institute of Standards and Technology, Technology Administration U.S. Department of Commerce, Information Security, NIST Special Publication 800-38D, Nov. 2007, 39 pages.

Dworkin, Morris, "Recommendation for Block Cipher Modes of Operation —Methods and Techniques" National Institute of Standards and Technology, Technology Administration U.S. Department of Commerce, Information Security, NIST Special Publication 800-38A, 2001, 66 pages.

Dworkin, Morris, "Recommendation for Block Cipher Modes of Operation —The CCM Mode for Authentication and Confidentiality" National Institute of Standards and Technology, Technology Administration U.S. Department of Commerce, Information Security, NIST Special Publication 800-38C, May 2004, updated 2007, 27 pages.

Dworkin, Morris, "Recommendation for Block Cipher Modes of Operation —the CMAC Mode for Authentication" National Institute of Standards and Technology, Technology Administration U.S. Department of Commerce, Information Security, NIST Special Publication 800-38B, May 2005, 25 pages.

Dworkin, Morris, "Recommendation for Block Cipher Modes of Operation —the XTS-AES Mode for Confidentiality on Storage Devices" National Institute of Standards and Technology, Technology Administration U.S. Department of Commerce, Information Security, NIST Special Publication 800-38E, Jan. 2010, 12 pages.

Fischer, Viktor , "Realization of the Round 2 AES Candidates Using Altera FPGA", (2000), pp. 1-15.

Gligor, Virgil D., et al., "Fast Encryption and Authentication: XCBC Encryption and EXCB Authentication Modes" Mar. 30, 2001 (Apr. 20, 2001, revision), 64 pages, retrieved from http://csrc.nist.gov/groups/ST/toolkit/BCM/modes_development.html.

Gligor, Virgil D., et al., "On Message Integrity in Symmetric Encryption" Nov. 10, 2000, 41 pages. VDG Inc., Maryland.

HÅstad, Johan, et al., "Key Feedback Mode: a Keystream Generator with Provable Security" Oct. 11, 2000, 23 pages, Stockholm, Sweden.

Hellstrom, Henrick, "Propagating Cipher Feedback mode" 2001, 4 pages.

Housely, Russ, et al., "Counter with CBC-MAC (CCM)—AES Mode of Operation" RSA Laboratories, Submission to National Institute of Standards and Technology, Jun. 3, 2002, 9 pages Iwata, Tetsu, et al., "OMAC: One-Key CBC MAC" Dec. 20, 2002, 32 pages.

Jaulmes, Antoine Joux, et al., "On the Security of Randomized CBC-MAC Beyond the Birthday Paradox Limit a New Construction" 2002, 15 pages, DCSSI Crypto Lab.

Jutla, Charanjit S., "Encryption Modes with Almost Free Message Integrity" IBM T.J. Watson Research Center, New York, 2001, 6 pages.

Jutla, Charanjit S., "Parallelizable Encryption Mode with Almost Free Message Integrity" IBM T.J. Watson Research Center, 2000, 23 pages.

Knudsen, Lars R., "Reports in Informatics—Block Chaining modes of operation" Oct. 2000, 16 pages, Report No. 207, Department of Informatics, University of Bergen, Bergen, Norway.

Kohno, Tadayoshi, et al., "The CWC Authenticated Encryption (Associated Data) Mode" May 27, 2003, 18 pages, Submission to National Institute of Standards and Technology.

Kurosawa, Kaoru, et al., "TMAC: Two-Key CBC MAC" Jun. 21, 2002, 18 pages.

Lipmaa, Helger, et al.,"Comments to NIST concerning AES Modes of Operations: " CTR-Mode Encryption 2000, 4 pages.

Mattsson, Ulf T., "Format-Controlling Encryption using Datatype-Preserving Encryption" Jun. 30, 2009, 46 pages, Protegrity Corporation.

McGrew, David A., et al., The Galois/Counter Mode of Operation (GCM) Submission to National Institute of Standards and Technology, May 31, 2005, 44 pages.

Mirza, Fauzan, "Block Ciphers and Cryptanalysis" Mar. 1998, pp. 1-27.

Rogaway, Phillip, "PMAC—Proposal to NIST for a parallelizable message authentication code" Apr. 1, 2001, 27 pages.

Rogaway, Phillip, et al., "OCB: A Block-Cipher mode of operation for Efficient Authenticated Encryption" Aug. 3, 2001, 36 pages.

Rogaway, Phillip, et al., "The SIV Mode of Operation for Deterministic Authenticated-Encryption (Key Wrap) and Misuse-Resistant Nonce-Based Authenticated-Encryption" Aug. 20, 2007, 3 pages, retrieved from http://csrc.nist.gov/groups/ST/toolkit/BCM/modes_development.html.

Rose, Greg , "A Stream Cipher Based on Linear Feedback over GF(28) ", Springer-Verlag Berlin Heidelberg, C. Boyd and E. Dawson: ACISP '98, LNCSI1438, (1998), pp. 135-145.

Schroeppel, Richard C., et al., "Cipher-State (CS) Mode of Operation for AES" Sandia National Laboratories, Submission to National Institute of Standards and Technology, May 7, 2004, 8 pages.

Schneier, "Applied Cryptography", John Wiley and Sons, 2nd Edition, (1996), p. 319.

Shannon, C.E., "Communication Theory of Secrecy Systems" Bell System Techinical Journal, vol. 28, (4) 1949, pp. 656-715.

"Transposition cipher", Wikipedia, the free encyclopedia, http://en.wikipedia.org/wiki/Transposition_cipher, accessed May 8, 2007, 8 pages.

Red Hat Office Action for U.S. Appl. No. 11/807,261 mailed Jul. 19, 2010.

Red Hat Office Action for U.S. Appl. No. 12/072,069 mailed Sep. 2, 2010.
Red Hat Office Action for U.S. Appl. No. 12/074,012 mailed Sep. 3, 2010.
Applied Cryptography, 2nd Edition, Chapter 17, pp. 417-418.
"Blum Blum Shub" from Wikipedia, the free encyclopedia, http://en.wikipedia.org/wiki/Blum_Blum_Shub. Aug. 9, 2007, 2 pages.
"Finite Field" from Wikipedia, the free encyclopedia. http://en.wikipedia.org/wiki/Galois_field, Aug. 10, 2007, 5 pages.
"Secure Cryptoprocessor" from Wikipedia, the free encyclopedia. http://en.wikipedia.org/wiki/Secure_cryptoprocessor. Aug. 10, 2007, 3 pages.
Wolfram Math World, Primitive Polynomials, http://mathworld.wolfram.com/primitivepolynomial.html, pp. 1-2, Feb. 9, 2006 from Internet Archive WayBack Machine.
Red Hat Office Action for U.S. Appl. No. 11/897,411 mailed Sep. 2, 2010.
Red Hat Office Action for U.S. Appl. No. 11/897,414 mailed Sep. 2, 2010.
U.S. Appl. No. 11/807,261, Notice of Allowance dated Dec. 13, 2010.
U.S. Appl. No. 11/897,411, Final Office Action dated Jan. 5, 2011.
U.S. Appl. No. 11/897,414, Final Office Action dated Dec. 28, 2010.
U.S. Appl. No. 12/072,069, Final Office Action dated Jan. 5, 2011.
U.S. Appl. No. 12/074,012, Notice of Allowance dated Jan. 11, 2011.
U.S. Appl. No. 12/154,465, Office Action dated Sep. 20, 2010.
U.S. Appl. No. 12/154,465, Final Office Action dated Jan. 7, 2011.
Schneier, "Applied Cryptography" 1996, John Wiley and Sons, $2^{nd}$ Edition, p. 237.
Red Hat Office Action for U.S. Appl. No. 11/807,261 Office Action mailed Feb. 28, 2011.
Red Hat Office Action for U.S. Appl. No. 12/072,069, Office Action mailed Apr. 29, 2011.
Notice of Allowance for U.S. Appl. No. 11/807,261 Mailed Mar. 14, 2011.
Red Hat Office Action for U.S. Appl. No. 12/154,465, mailed Dec. 28, 2011.
Red Hat Office Action for U.S. Appl. No. 11/897,411, mailed Dec. 21, 2011.
Red Hat Office Action for U.S. Appl. No. 11/897,411, mailed Aug. 26, 2011.
Red Hat Office Action for U.S. Appl. No. 11/897,414 Mailed Dec. 1, 2011.
Red Hat Office Action for U.S. Appl. No. 12/072,069, mailed Oct. 3, 2011.
Red Hat Notice of Allowance for U.S. Appl. No. 12/074,012, Mailed Jan. 11, 2011.
Red Hat Office Action for U.S. Appl. No. 12/125,833, mailed Dec. 9, 2011.
Red Hat Office Action for U.S. Appl. No. 12/154,465, mailed Aug. 19, 2011.
Jamie McLauchlin, "Random Number Generation for Cryptography," http://imps.mcmaster.ca/courses/SE-4C03-07/wiki/mclaucwj/Random_Number_Generation_for_Cryptography.html, Apr. 6, 2007, 3 pages.

* cited by examiner

NONLINEAR FEEDBACK MODE FOR BLOCK CIPHERS

TECHNICAL FIELD

Embodiments of the present invention relate to data encryption, and more specifically to data encryption with a block cipher that uses a nonlinear mode of operation.

BACKGROUND

Encryption is a process of transforming information (referred to as plaintext) into an unreadable form (referred to as ciphertext). Decryption is a transformation that recovers the plaintext from the ciphertext. A cipher performs a transformation that is controlled using a symmetric key (same key used for ciphering and deciphering) or an asymmetric key (different keys used for ciphering and deciphering) such that when the key is input to the cipher along with plaintext, the plaintext is enciphered via an encryption transformation, and when the key is input to the cipher along with ciphertext, the ciphertext is deciphered via a decryption transformation (which is an inverse of the encryption transformation). Encryption transformations are performed by an encryption algorithm (function) of a cipher, and decryption transformations are performed by a decryption algorithm (function) of the cipher.

Encryption is used to protect military and civilian systems, examples of which include internet e-commerce, mobile telephone networks, bank automatic teller machines, etc. As technology and computing power advance, new vulnerabilities are commonly discovered for encryption mechanisms that were previously considered secure. When such weaknesses are discovered, new encryption mechanisms and techniques are required to maintain security of sensitive information.

FIG. 1 illustrates a conventional encryption system 100. In the conventional encryption system 100, a message source 105 generates a message that includes plaintext data and sends it to encipherer 115. Encipherer 115 also receives a key from a key source 110. Encipherer 115 uses the key to encrypt the plaintext data into ciphertext, and then transmits the ciphertext to a decipherer 120 over a potentially unsecure channel. Decipherer 120 also receives the key from the key source 110 via a secure channel. Decipherer 120 decrypts the ciphertext using the key to re-create the plaintext data, and then transmits the plaintext data to a destination 130. The transmission of the ciphertext between the encipherer 115 and a decipherer 120 is exposed to the risk that a cryptanalyst 125 will intercept the ciphertext and attempt to decrypt it to re-create the plaintext. Therefore, it is important that the encipherer 115 and decipherer 120 use an encryption scheme that is resistant to decryption attacks.

BRIEF DESCRIPTION OF THE DRAWINGS

The present invention is illustrated by way of example, and not by way of limitation, in the figures of the accompanying drawings and in which.

DETAILED DESCRIPTION

Figure 1:
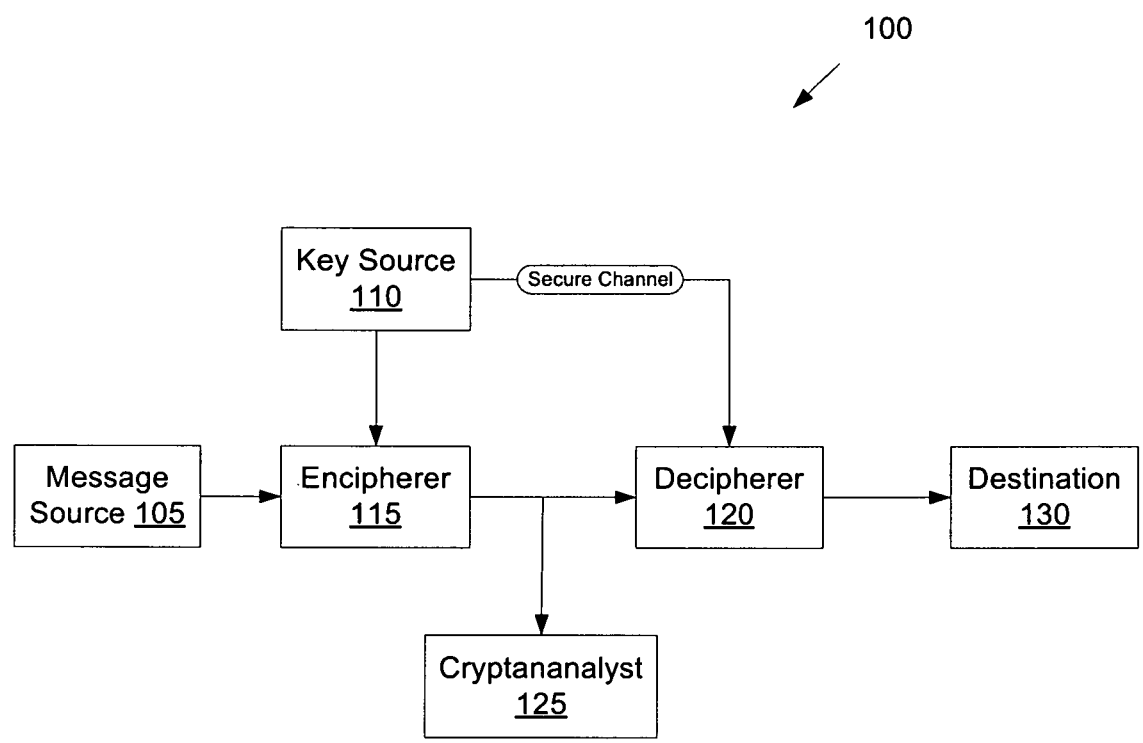
FIG. 1 illustrates a conventional encryption system.

Described herein is a method and apparatus for encrypting and decrypting data. In one embodiment, plain text, a secret key and a primitive polynomial that defines a finite field of even characteristic are received. The plain text is divided into multiple plain text blocks. For each plain text block of the plurality of plain text blocks other than a first plain text block, the plain text block is multiplied by a preceding cipher text block over the finite field of even characteristic, modulo the primitive polynomial, to generate an intermediate block. The preceding cipher text block may have been generated from a preceding plain text block. Each intermediate block is processed by a block cipher using the secret key to generate a subsequent cipher text block. The block cipher operates in a nonlinear feedback mode of operation.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating", "dividing", "receiving", "performing", "encrypting", "processing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

To better equip a reader to be able to understand the detailed description included herein, a brief description of finite field arithmetic is provided. A finite field (also known as a Galois Field) is a field that contains only finitely many elements. A finite field can be represented mathematically as $GF(p^m)$, where p is a prime number called the "characteristic" and m is an integer greater than or equal to 1 called the "dimension" of the field. Each finite field has an "order" in the form of $p^m$, which represents the number of elements within the finite field. There exists a unique finite field of the order $p^m$ for every prime number p and integer $m \geq 1$, up to isomorphism. Any two finite fields with the same number of elements are isomorphic.

Arithmetic in a finite field is different than standard integer arithmetic. Using finite field arithmetic, all operations performed in the finite field result in an element of the finite field. For example, in a finite field of GF(2) the only elements of the field are 0 and 1, and thus 1+1=0. Elements of a finite field $GF(p^m)$ may be represented as polynomials of degree strictly less than m over GF(p). Mathematical operations (e.g., addition, multiplication, etc.) can be performed modulo Y, where Y is a primitive polynomial of degree m over GF(p). A primitive polynomial is a minimal polynomial of a primitive element of the extension field $GF(p^m)$.

In certain embodiments of this invention, finite fields of $GF(2^m)$ are used for the purposes of cryptography. In such finite fields, in which the prime (p) is of even characteristic (2), polynomials can be represented as binary strings. For example, the polynomial $x^6+x^4+x+1$ can be represented as the binary string 1010011. In finite fields with characteristic 2, addition and subtraction are identical, and can be accomplished using the exclusive OR (XOR) operator. The symbol $\oplus$ represents addition within a finite field. Multiplication for such finite fields is polynomial multiplication modulo a primitive polynomial of degree m over GF(2). The symbol $\otimes$ represents multiplication within a finite field.

Figure 2A:
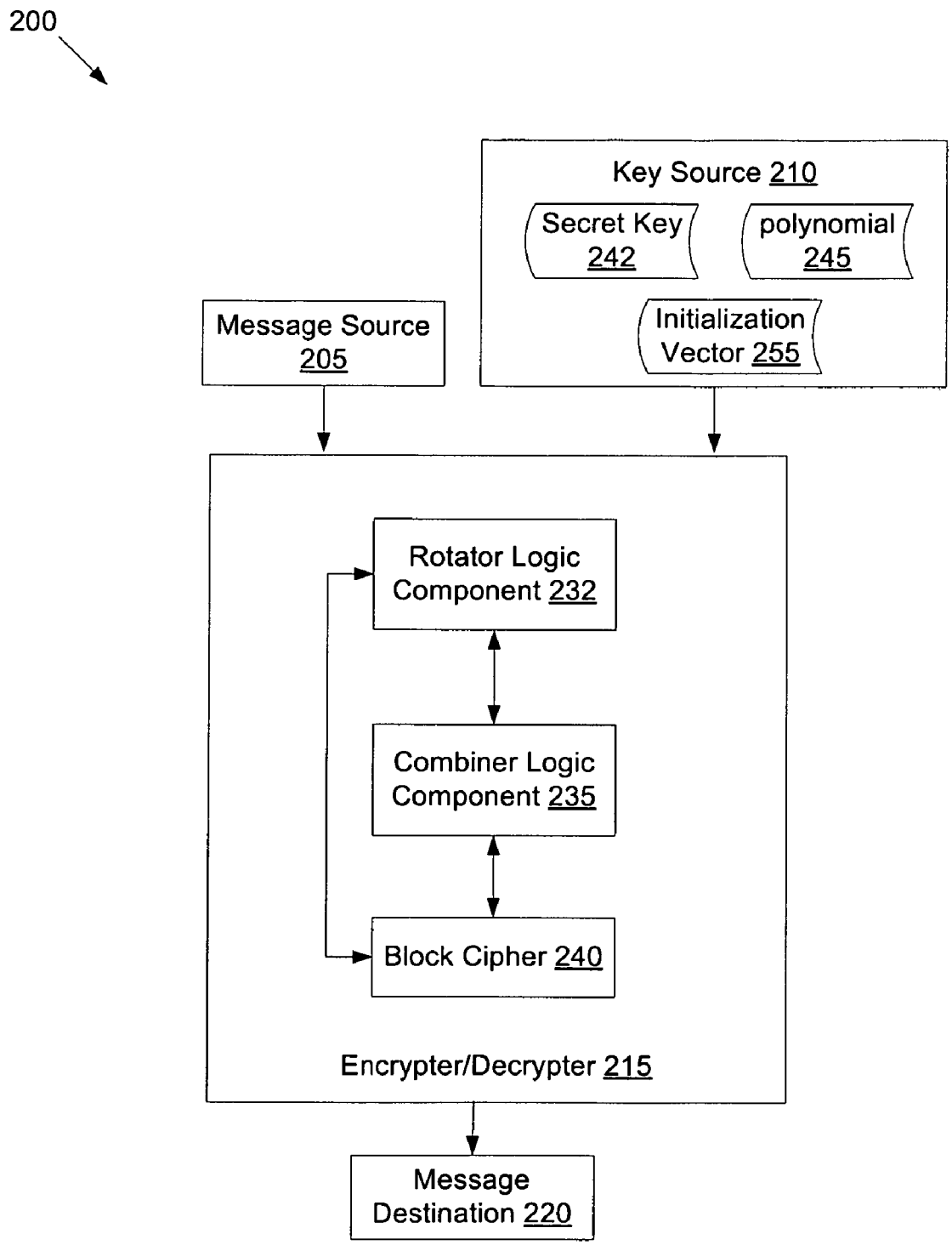
FIG. 2A illustrates an encryption system, in accordance with one embodiment of the present invention.

FIG. 2A illustrates an encryption system 200, in accordance with one embodiment of the present invention. The encryption system 200 may include a message source 205, a key source 210, an encrypter/decrypter 215 and a message destination 220. Message source 205 may be a user, an application (e.g., a mail application), a file system or database, a region of memory, or some other source. Message source 205 can transmit or otherwise provide plain text data or cipher text data to encrypter/decrypter 215 for encryption or decryption, respectively. The encrypter/decrypter 215 enciphers (encrypts) or deciphers (decrypts) such data before sending the data on to a message destination 220.

To encipher or decipher the received data, encrypter/decrypter 215 receives a secret key 242 from a key source 210. The encrypter/decrypter 215 may also receive a primitive polynomial 245 and/or an initialization vector 255 from the key source 210. Alternatively, the initialization vector 255 may be received from message source 205, or may be generated by encrypter/decrypter 215. A different initialization vector 255 may be used by encrypter/decrypter 215 each time a new plaintext is encrypted. In one embodiment, the initialization vector has a block size that is equivalent to a block size of block cipher 240.

In one embodiment, the primitive polynomial 245 is a portion of the secret key 242. In another embodiment, the primitive polynomial is derived from the secret key 242. For example, the first n bits of the key may be tested to see if the first n bits form a primitive polynomial of n degrees. If the first n bits of the key do not form a primitive polynomial, then the next n bits may be tested, and so on. In one embodiment, if no primitive polynomial of n degrees is found, the secret key 242 can be extended, and the extended bits can be tested, until a primitive polynomial is found. In one embodiment, primitive polynomial 245 is of a degree that is equivalent to a block size of block cipher 240.

In one embodiment, the key source 210 includes a key generator that can receive an input from a user, and use that input to generate a key or multiple keys. The key generator may also generate the primitive polynomial 245 and/or the initialization vector 255 (e.g., based on user input or other factors). The key source 210 may, for example, run a hash over a received password multiple times to generate a key and/or a primitive polynomial 245. The key source 210 may also use a random bit generator that is keyed to a user password. In one embodiment, the key source 210 uses a stream cipher with a starting state that is based on a user password to generate keys. Alternatively, the key source 210 may be a memory or other storage location that stores keys. For example, the key source 210 may be a universal serial bus (USB) key token, a protected region of memory used to store keys, etc.

Encrypter/decrypter 215 is an application, software component, hardware component or device that is configured to encrypt and decrypt data. In one embodiment, encrypter/decrypter 215 includes a block cipher 240. Block ciphers are substitution ciphers that operate on fixed-length groups of bits known as blocks. Where data to be encrypted is longer than a block, the data is divided into multiple blocks, and each block is separately encrypted. In one embodiment, block cipher 240 has an encryption and a decryption algorithm, each of which accepts an input block of size n bits as a first input and a key of size k bits as a second input, and produce an n-bit output block. For example, block cipher 240 might take as an input a 128-bit block of plaintext (unciphered data) and an 80 bit key, and output a corresponding 128-bit block of ciphertext (ciphered data). Likewise, block cipher 240 may take as an input a 128-bit block of ciphertext and the 80 bit key, and output a 128-bit block of plaintext. In another embodiment, the encryption algorithm may accept an input block of size m bits, and output a block of size n bits, and the decryption algorithm may accept an input block of size n bits, and output a block of size m bits. Common block sizes for block cipher 240 to operate on include 64 bit (8 byte) and 128 bit (16 byte), and common key sizes include 40 bits, 56 bits, 64 bits, 80 bits, 128 bits, 160 bits, 168 bits, 192 bits and 256 bits. Other sized blocks and keys may also be used. Increasing the size of the key may increase the difficulty of deciphering the ciphertext without the key.

Ciphertext output by block cipher 240 may include the same set of symbols as the input plaintext, or a different set of symbols. Moreover, an output alphabet (set of output symbols) of block cipher may have a number of symbols that is the same as or different from the number of symbols in an input alphabet (set of input symbols). Examples of block ciphers include twofish, blowfish, serpent, data encryption standard (DES), advanced encryption standard (AES), CAST5, international data encryption algorithm (IDEA), etc.

In one embodiment, encrypter/decrypter 215 is configured to encrypt or decrypt data using block cipher 240 in a nonlinear mode of operation. By using block cipher 240 in a nonlinear mode of operation, encrypter/decrypter 215 may encrypt different blocks of data in different ways with the same block cipher 240 and secret key 242. Thereby, even if two different blocks of data include the same plaintext, the corresponding ciphertext will be different for the two blocks. Therefore, the nonlinear mode of operation enables the block cipher to act as a stream cipher.

In one embodiment, encrypter/decrypter 215 includes a rotator logic component 232 and a combiner logic component 235. In one embodiment, plaintext is modified by rotator logic component 232 and/or combiner logic component 235 before it is processed by block cipher 240. Alternatively, rotator logic component 232 and/or combiner logic component 235 may modify an output of block cipher 240 before it is output as ciphertext. Rotator logic component 232 and combiner logic component 235 perform operations on plaintext and/or ciphertext that allow block cipher 240 to provide confidentiality for messages of arbitrary length.

Rotator logic component 232 modifies blocks of data (e.g., plain text blocks or blocks output by block cipher 240) by rotating bits in the data. For example, if a block of data includes the bit sequence 1100111, the rotator logic component 232 may rotate the block by three bits to the right, providing 1111100, or three bits to the left, providing 0111110. The number of bits by which to rotate the block of data is determined by a secret bit sequence. In one embodiment, the secret bit sequence includes 1 g(n) (binary log of n) bits. The binary log of n provides the number of bits required to represent a number between 0 and (n−1). For example, if the block size is 64 bits (n=64), then the secret bit sequence may include 6 bits, which may represent a value from 0-63.

A different secret bit sequence is used for each block processed by rotator logic component 232. In one embodiment, the secret bit sequence is determined by rotator logic component 232 based on previous ciphertext blocks and/or plaintext blocks (e.g., by using a cryptographic hash function on preceding plaintext blocks). The secret bit sequence may also depend on the secret key 242. Alternatively, the secret bit sequence may be provided by a stream cipher (not shown). By rotating blocks of data before or after they are processed by block cipher 240, nonlinearity is introduced to the encryption provided by encrypter/decrypter 215.

Combiner logic component 235 performs a mathematical operation that combines two blocks of equivalent block size. Combiner logic component 235 may combine, for example, the initialization vector 255 with a plain text block, a plain text block with a previous cipher text block, etc. In one embodiment, combiner logic component 235 combines blocks using the XOR operation. In another embodiment, combiner logic component 235 performs a nonlinear combination of the two blocks. In a further embodiment, the nonlinear combination is achieved by multiplying the plain text block by the initialization vector or a previously generated ciphertext block over a finite field of even characteristic (e.g., $GF(2^m)$), modulo the polynomial 245. In still a further embodiment, polynomial 245 is a primitive polynomial of a finite field $GF(2^m)$. The primitive polynomial may be a dense polynomial (a polynomial having many terms, e.g., $x^5+x^4+x^2+x+1$) or a sparse polynomial (a polynomial having few terms, e.g., $x^4+x^2+1$). In one embodiment, sparse polynomials are used in software implementations to reduce processing time.

Polynomial multiplication performed over a finite field of even characteristic has the property that all of the output bits of a block depend on all of the input bits. However, this dependency does not introduce any propagation delays for carried bits (e.g., there is no carry over from one bit position that will influence the result of another bit position). This property enables multiplication over a finite field of even characteristic to be pipelined efficiently, and allows for fast calculations in hardware implementations.

In one embodiment, encrypter/decrypter 215 provides the ciphertext or plaintext to the message destination 220 as each block of ciphertext or plaintext is generated. Alternatively, encrypter/decrypter 215 may wait until an entire message (e.g., including multiple blocks) has been encrypted or decrypted before providing that message to message destination 220. Message destination 220 may be an application, user, file system, database, etc.

Figure 2B:
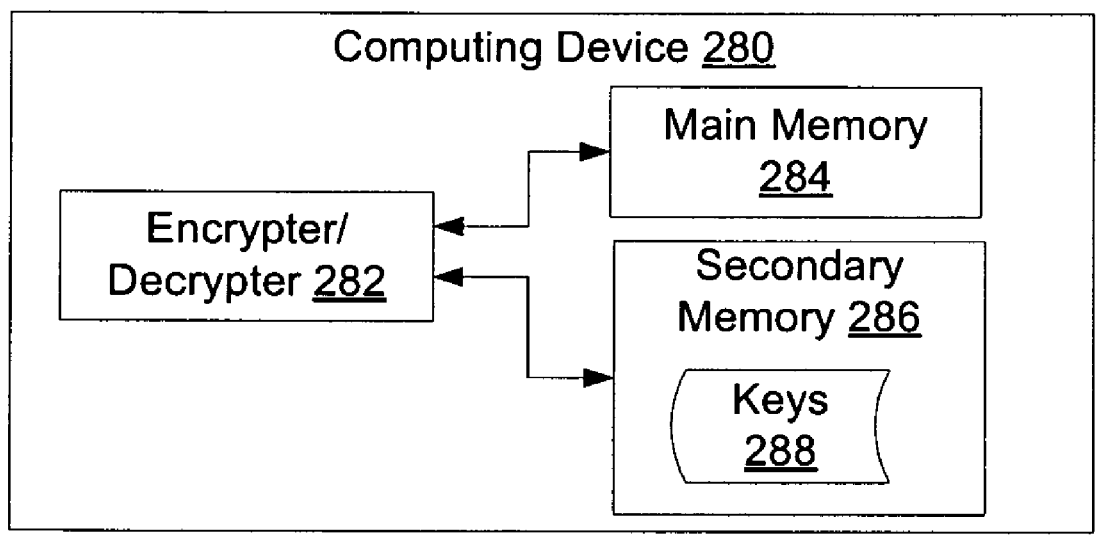
FIG. 2B illustrates an exemplary computing device, in accordance with one embodiment of the present invention.

FIG. 2B illustrates an exemplary computing device 280, in accordance with one embodiment of the present invention. The computing device 280 includes encrypter/decrypter 282 connected with a main memory 284 and a secondary memory 286. Encrypter/decrypter 282 may represent encrypter/decrypter 215 discussed above with reference to FIG. 2A. The main memory 284 may include volatile memory (e.g., read-only memory (ROM), flash memory, dynamic random access memory (DRAM) such as synchronous DRAM (SDRAM) or Rambus DRAM (RDRAM), etc.) or static memory (e.g., flash memory, static random access memory (SRAM), etc.). The secondary memory 286 may include one or more persistent data storage devices that may include, for example static memory, hard drives, optical drives, tape backup systems, etc. The secondary memory 286 may be local to the computing device 280 (as illustrated), or external to the computing device 280.

In one embodiment, keys 288 (e.g., secret key 242 and polynomial 245 of FIG. 2A) are stored in secondary memory 286. In another embodiment, keys 288 are stored in main memory 284. Keys 288 may be stored, for example, in a protected region of main memory 284 or secondary memory 286 (memory accessible only to certain processes). In yet another embodiment, keys 288 are stored externally to computing device 280. Such externally stored keys 288 may be stored, for example, in a USB dongle, firewire dongle, or other external storage device. In embodiments that implement external keys, encrypted regions of the main memory 284 and secondary memory 286 may not be decrypted unless the external storage device having keys 288 is connected with computing device 280.

In one embodiment, encrypter/decrypter 282 is a hardware component of computing device 280. Alternatively, encrypter/decrypter 282 may include software that is part of an operating system, an application, or a combination thereof. Encrypter/decrypter 282 may also be a combination of software and hardware.

Encrypter/decrypter 282 can encipher data in the main memory 284 and the secondary memory 286 to secure such data. When enciphering data, new keys may be generated and stored, or existing keys may be provided. In one embodiment, the encrypter/decrypter 282 is configured to encrypt all of secondary memory 286 and main memory 284. In another embodiment, only some of the main memory 284 and/or secondary memory 286 are encrypted (e.g., using filesystem-level encryption). In both instances, encrypted data may not be read or used until encrypter/decrypter 282 deciphers the enciphered data using the same keys 288 used to encrypt the data.

Figure 3A:
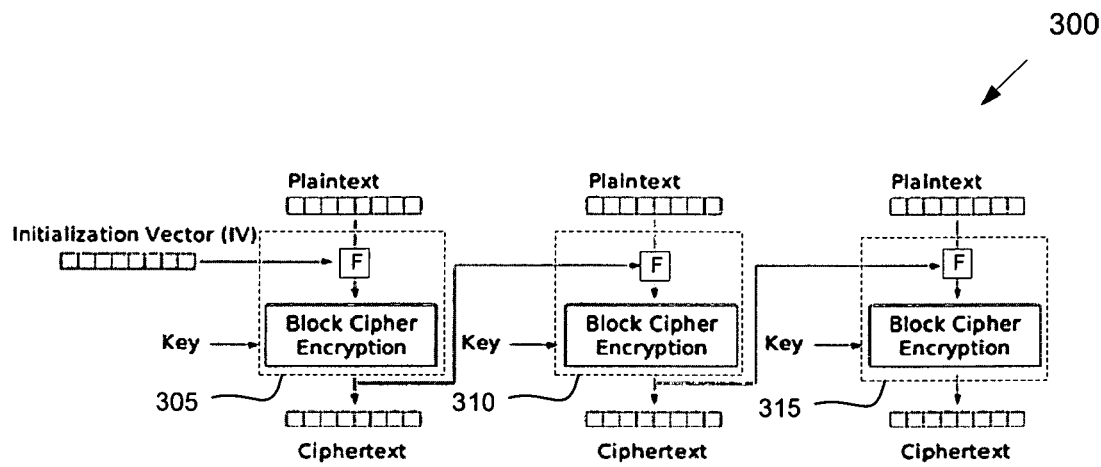
FIG. 3A illustrates a pictorial view of a data encryption process, in accordance with one embodiment of the present invention.

FIG. 3A illustrates a pictorial view of a data encryption process 300, in accordance with one embodiment of the present invention. In one embodiment, plaintext data is processed by encrypter/decrypter 215 of FIG. 2A to generate ciphertext.

In the illustrated embodiment, the encrypter/decrypter performs a first encryption round 305, a second encryption round 310, up to an nth encryption round 315 to generate an output of ciphertext blocks. In the first encryption round 305, an initialization vector is multiplied by a plain text block over a finite field of even characteristic, modulo a primitive polynomial, by an encryption function F to combine plaintext with an initialization vector. In an example, if the plaintext is 0110 0001 (the ASCII representation of the letter 'a' in binary), the initialization vector is 1010, and the primitive polynomial is 10011, the output of the function F in the first round 305 would be:

$$0001 \otimes 1010 \bmod 10011 = 1010$$

The output of the function F in the first round 305 is then processed by the block cipher to generate a first ciphertext block.

In the second encryption round 310, the encrypter/decrypter uses the encryption function F to combine the ciphertext block generated in the first round of encryption with another plaintext block. In one embodiment, function F performs a nonlinear combination by multiplying the ciphertext block by the plaintext block over the finite field of even characteristic, modulo the primitive polynomial. The output of the function F in the second round 310 is then processed by the block cipher to generate another ciphertext block. This process may continue until the nth round of encryption 315 has been completed, to generate a final output of ciphertext.

Figure 3B:
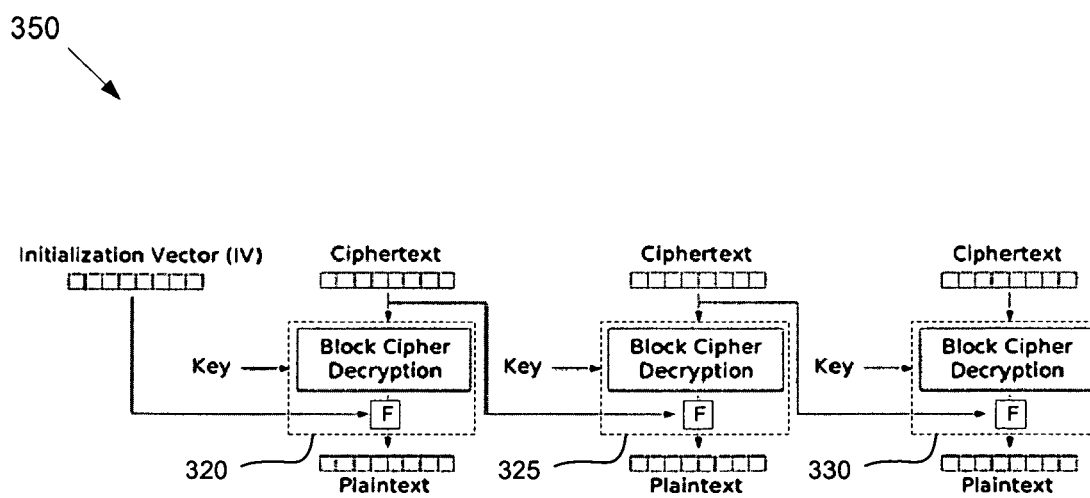
FIG. 3B illustrates a pictorial view of a data decryption process, in accordance with one embodiment of the present invention.

FIG. 3B illustrates a pictorial view of a data decryption process 350, in accordance with one embodiment of the present invention. The data decryption process is an inverse of the data encryption process illustrated in FIG. 3A. In one embodiment, the data is processed by encrypter/decrypter 215 of FIG. 2A.

Referring to FIG. 3B, data in the form of ciphertext is input into the encrypter/decrypter. The encrypter/decrypter can include up to n rounds of decryption (matching a number of rounds of encryption used to generate the ciphertext). To properly decrypt the ciphertext, the key, initialization vector and primitive polynomial used in decryption should correspond to those used for encryption. In the illustrated embodiment, the encrypter/decrypter performs a first decryption round 320, a second decryption round 325 through an nth decryption round 330.

In the first decryption round 320, the block of ciphertext generated during the first encryption round 305 is processed by the block cipher. The output is then multiplied by the initialization vector over the finite field of even characteristic, modulo the primitive polynomial, by encryption function F to output a first plaintext block.

In the second decryption round 325, the ciphertext block generated during the second round 310 of encryption is processed by the block cipher. The output is then multiplied with the ciphertext block generated during the first encryption round 305 over the finite field of even characteristic, modulo the primitive polynomial by encryption function F to output a second plaintext block. This process may continue until the nth round of decryption 330 has been completed, to generate a final plaintext block.

The exemplary encryption and decryption processes shown above in FIG. 3A and FIG. 3B, respectively, illustrate application of a particular nonlinear mode of operation, in accordance with one embodiment of the present invention. In other embodiments, a combining function that multiplies data elements over a finite field of even characteristic, modulo a primitive polynomial, may be used to replace XOR functions of well-known modes of operation. For example, in embodiments of the present invention, the XOR functions in cipher feedback mode, output feedback mode, counter mode, etc. may be replaced with the function that multiplies data elements over a finite field of even characteristic, modulo a primitive polynomial. Such replacement of the XOR functions of existing modes of operation by a nonlinear combination that uses multiplication over a finite field of even characteristic, modulo a fixed primitive polynomial can improve the security of such modes of operation.

Figure 4:
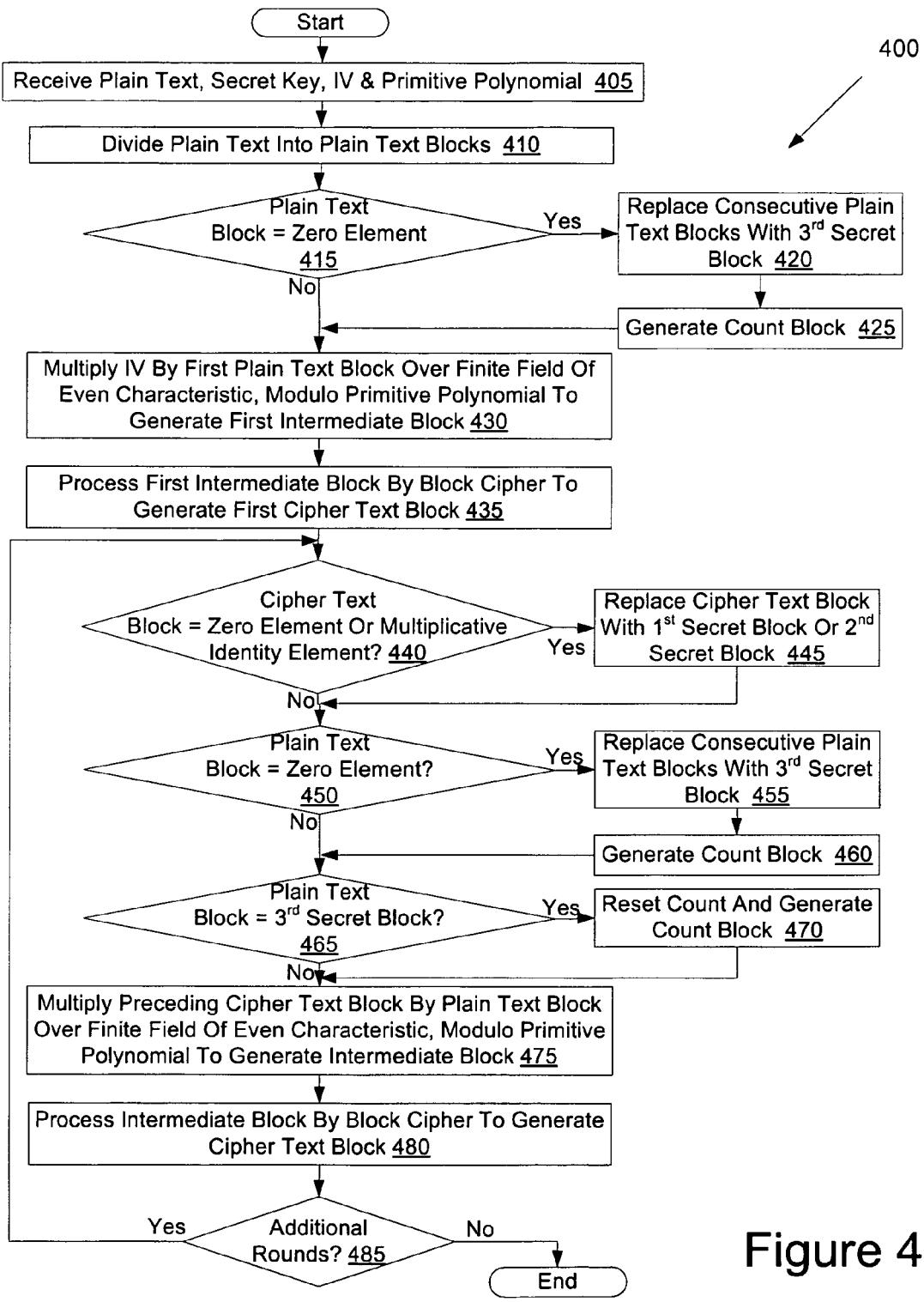
FIG. 4 illustrates a flow diagram of one embodiment for a method of encrypting data.

FIG. 4 illustrates a flow diagram of one embodiment for a method 400 of encrypting data. The method may be performed by processing logic that may comprise hardware (e.g., circuitry, dedicated logic, programmable logic, microcode, etc.), software (such as instructions run on a processing device), or a combination thereof. In one embodiment, method 400 is performed by encrypter/decrypter 215 of FIG. 2A.

Referring to FIG. 4, method 400 includes receiving plain text, a secret key, an initialization vector and a primitive polynomial (operation 405). In one embodiment, the primitive polynomial is included in the secret key. The plaintext may be provided by a message source, such as an application, a user, a file system, a database, etc. The plaintext may include more bits than can be operated on by a block cipher included in the encrypter/decrypter. In such an occurrence, at operation 410 the plaintext is divided into multiple plaintext blocks, each of which is sized such that the block cipher can operate on it.

At operation 415, the encrypter/decrypter determines whether a first plain text block is the zero element of the finite field of even characteristic defined by the primitive polynomial. The zero element is an element that, when multiplied by another block, will result in a block having all zeros. Therefore, the zero element will always encipher to the same ciphertext block. Accordingly, if the plain text block is the zero element, the method proceeds to operation 420. If the plain text block is not the zero element, the method continues to operation 430.

At operation 420, the encrypter/decrypter replaces the plaintext block and any subsequent zero element blocks with a single third secret block (first and second secret blocks are addressed below). The method then continues to operation 425, at which the encrypter/decrypter generates a count block. The count block is treated as a plain text block. Accordingly, the count block will be the next plaintext block that will be operated on. The count block has a count that is based on the number of consecutive plain text blocks (including the first plain text block) that were replaced by the third secret block. In one embodiment, the count block is constructed from the representation of the element $x^{n+c+1}$, wherein n is the block size, and c is the count being represented. In one embodiment, c is limited to the range $0-2^s$, where s is the greatest integer not greater than n. During decryption, recovering c could include iteratively multiplying the deciphered block by the multiplicative inverse of x until the block representing $x^{n+1}$ is produced. Alternatively, if c is constrained to be reasonably small, a table of constructed blocks may be used. The method continues to operation 430.

At operation 430, the encrypter/decrypter multiplies the initialization vector by the first plaintext block over a finite field of even characteristic, modulo the primitive polynomial, to generate a first intermediate block. If the plaintext block was replaced by the third secret block at operation 420, then the encrypter/decrypter multiplies the initialization vector by the third secret block. At operation 435, the encrypter/decrypter processes the first intermediate block using a block cipher to generate a first ciphertext block.

At operation 440, the encrypter/decrypter determines whether the ciphertext block is equal to the zero element or a multiplicative identity element of the finite field of even characteristic. The multiplicative identity element is the element of a set with respect to a multiplication operation on that set that leaves other elements of the set unchanged when combined with the element. For example, for real numbers the multiplicative identity element is 1. If the ciphertext block is either the zero element or the multiplicative identity element, the method proceeds to operation 445. Otherwise, the method continues to operation 450.

At operation 445, if the ciphertext block is the zero element, the encrypter/decrypter replaces the ciphertext block with a first secret block. In one embodiment, the replacement of the zero element block occurs in an initialization vector position for the multiplication in operation 475. In one embodiment, the zero element block itself is added to the output stream. If the ciphertext block is the multiplicative identity element, the encrypter/decrypter replaces the ciphertext block with a second secret block. The first, second and third secret blocks can either be specified up front and fixed, they can be generated from specific values using the underlying block cipher, or they can be derived from the initialization vector. Generating the secret blocks from the initialization vector gives different values for each different initialization vector. The method then proceeds to operation 450.

At operation 450, the encrypter/decrypter determines whether a next plaintext block is equal to the zero element. If the next plaintext block is equal to the zero element, the method proceeds to operation 455. Otherwise, the method continues to operation 465.

At operation 455, the encrypter/decrypter replaces the plaintext block and any subsequent consecutive plaintext blocks with a single third secret block. The method then continues to operation 460, at which the encrypter/decrypter generates a count block. The count block has a count that is equal to the number of consecutive plain text blocks that were replaced by the third secret block. The method then continues to operation 465.

At operation 465, the encrypter/decrypter determines whether the plaintext block is equal to the third secret block. If the plaintext block is equal to the third secret block, the method continues to operation 470. Otherwise, the method continues to operation 475.

At operation 470, the encrypter/decrypter resets the count, and generates a count block having a count of zero. The method then continues to operation 475.

At operation 475, the encrypter/decrypter multiplies a preceding ciphertext block by a current plaintext block over a finite field of even characteristic, modulo the primitive polynomial to generate an intermediate block. If the plaintext block has been replaced by the third secret block, then it is the secret block that is multiplied by the preceding ciphertext block to generate the intermediate block. Additionally, if a count block has been generated, the count block is also multiplied by the preceding ciphertext block over the finite field of even characteristic, modulo the primitive polynomial to generate an additional intermediate block. At operation 480, the intermediate block (and possibly the additional intermediate block) is processed by the block cipher to generate a ciphertext block.

At operation 485, the encrypter/decrypter determines whether additional rounds of encryption need to be performed. Additional rounds of encryption need to be performed, for example, if there are remaining plaintext blocks. If additional rounds of encryption do need to be performed, the method returns to operation 440. Otherwise the method ends.

Though method 400 has been described with reference to encrypting data, method 400 may also be performed to decrypt data that has been encrypted using method 400. To decrypt data, ciphertext would be received rather than plaintext, and operations 430 and 435 would be performed in reverse, such that the operation 435 is performed, followed by operation 430. Likewise, the operations 475 and 480 would also be reversed.

An example showing of one way to encrypt plain text using method 400 is detailed below, in accordance with one embodiment of the present invention. In the example, a 24 bit block size is used, and the multiplication is carried out over $GF(2^{24})$, as generated by the primitive polynomial $x^{24}+x^4+x^3+x+1$. Blocks are interpreted as most significant bit first, so the primitive polynomial can be represented as [01 00 00 1b] in hex. For this example, the initialization vector will be enciphered iteratively three times, with the values of the $1^{st}$, $2^{nd}$, and $3^{rd}$ iterations being used as first, second and third secret blocks, respectively. For the example, the following data (represented as hex) will be enciphered: [00 00 00 c9 d0 5a 00 00 00 00 00 00 00 00 00 00 10 29 ae]. Since embodiments of the present invention can be used with any block cipher, wherever an operation of processing a block by a block cipher is performed, the input and output values are shown without detailing how the output values were obtained. Different block ciphers would produce different outputs, and different secret keys would also produce different outputs. For the purposes of this example, it is not important how the block cipher converts a particular input block into an output block.

Continuing with the example, a random initialization vector [55 ba 24] is generated or received by the encrypter/decrypter. The initialization vector is then iteratively enciphered to produce a first secret block having the value [cd e2 db], a second secret block having a value [69 7b 62], and a third secret block having a value [10 29 ae].

Since the first block is [00 00 00], it is replaced with the third secret block [10 29 ae] and a count block signifying a count of 1. The count block has the value [10 29 ae 00 00 6c]. The replacement block is multiplied by the initialization vector to produce [55 ba 24] ⊗ [10 29 ae]=[25 c9 ba], and then processed by the block cipher to generate E[25 c9 ba]=[96 07 f0], where E[x] represents a block cipher processing an input block [x] to generate an encrypted output block. The count block is also multiplied by the preceding ciphertext block, to produce [96 07 f0] ⊗ [00 00 6c]=[a9 20 8b], and processed by the block cipher to generate E[a9 20 8b]=[bf 71 8c].

The next data block is enciphered by multiplying it with the preceding ciphertext block and processing it by the block cipher, to yield [bf 71 8c] ⊗ [c9 d0 5a]=[9f 59 01]=>E[95 59 01]=[00 00 01]. The next three blocks are zero blocks, and so are replaced with the third secret block [10 29 ae] and a count block signifying a count of 3. The count block has the value [10 29 ae 00 01 b0]. The last ciphertext block was [00 00 01] (the multiplicative identity element), and so is replaced by the second secret block [69 7b 62]. The second secret block is then multiplied by the plain text block to yield [69 7b 62] ⊗ [10 29 ae]=[14 d1 9c]=>E[14 d1 9c]=[2b 09 21]. The count block is also enciphered, as follows: [2b 09 21] ⊗ [00 01 b0]=[5c 05 a3]=>E[5c 05 a3]=[2b ce 54].

The last plain text block is equal to the third secret block. Therefore, a count block representing a count of zero, having a value [00 00 36], is generated. The last plain text block is enciphered as follows: [2b ce 54] ⊗ [10 29 ae]=[37 c2 90]=>E[37 c2 90]=[0b a6 81]. The count block is then also enciphered as follows: [0b a6 81] ⊗ [00 00 36]=[f7 6f 2d]=>E[7e 5f 1e]=[82 82 9b].

The resulting ciphertext output is therefore [55 ba 24 96 07 f0 bf 71 8c 00 00 01 2b 09 21 2b ce 54 0b a6 81 82 82 9b]. The ciphertext is two blocks longer than the plaintext in this example. In one embodiment, the ciphertext output may have a maximum of 2 times the number of bits that were in the input plaintext. To minimize expansion, if the plaintext has several isolated all zero blocks, the plaintext may be compressed using a compression algorithm before performing encryption.

A second example is now provided, showing decipherment of the ciphertext [55 ba 24 96 07 f0 bf 71 8c 00 00 01 2b 09 21 2b ce 54 0b a6 81 82 82 9b]. Decipherment works analogously to encipherment. In decipherment, the first, second and third secret blocks are generated from the initialization vector, having the same values identified above.

The ciphertext block [96 07 f0] is deciphered by the block cipher, producing D[96 07 f0]=[25 c9 ba], where D[x] represents a block cipher processing an input block x to produce a decrypted output block. The output of the block cipher [25 c9 ba] is then multiplied by the multiplicative inverse of [55 ba 24], to yield [25 c9 ba] ⊗ [(55 ba 24)$^{-1}$]=[25 c9 ba] ⊗ [32 bc 60]=[10 29 ae]. The ciphertext block [bf 71 8c] is then deciphered by the block cipher to produce D[bf 71 8c]=[a9 20 8b], and then multiplied by the multiplicative inverse of [96 07 f0], to provide [a9 20 8b] ⊗ [71 6e 17]=[00 00 6c]. The ciphertext block [00 00 01] is then deciphered by the block cipher to produce D[00 00 01]=[9f 59 01], then multiplied by the multiplicative inverse of [bf 71 8c], to generate [95 59 01] ⊗ [c9 50 91]=[c9 d0 5a].

Next, the ciphertext block [2b 09 21] is deciphered by the block cipher to produce D[2b 09 21]=[14 d1 9c], then multiplied by the multiplicative inverse of the second secret block [69 7b 62] (since the preceding block of ciphertext was 00 00 01). This multiplication produces [14 d1 9c] ⊗ [8c b0 49]=[10 29 ae]. The ciphertext block [2b ce 54] is then deciphered by the block cipher to produce D[2b ce 54]=[5c 05 a3], then multiplied by the multiplicative inverse of [2b 09 21], as follows: [5c 05 a3] ⊗ [ad 78 70][00 01 b0].

Subsequently, the ciphertext block [0b a6 81] is deciphered by the block cipher to produce D[0b a6 81]=[37 c2 90], then multiplied by the multiplicative inverse of [2b ce 54], as follows: [37 c2 90] ⊗ [fa e3 aa]=[10 29 ae]. The ciphertext block [82 82 9b] is then deciphered by the block cipher to produce D[82 82 9b]=[f7 6f 2d], then multiplied by the multiplicative inverse of [0b a6 81], as follows: [f7 6f 2d] ⊗ [e4 66 03]=[00 00 36].

Finally, blocks that are equal to the third secret block [10 29 ae] are replaced with consecutive zero blocks, or a single block of [10 29 ae], as appropriate: 10 [29 ae 00 00 6c]=>[00 00 00]; [10 29 ae 00 01 b0]=>[00 00 00 00 00 00 00 00 00]; and [10 29 ae 00 00 36]=>[10 29 ae]. The reconstructed plaintext is then [00 00 00 c9 d0 5a 00 00 00 00 00 00 00 00 00 10 29 ae], as expected.

Figure 5A:
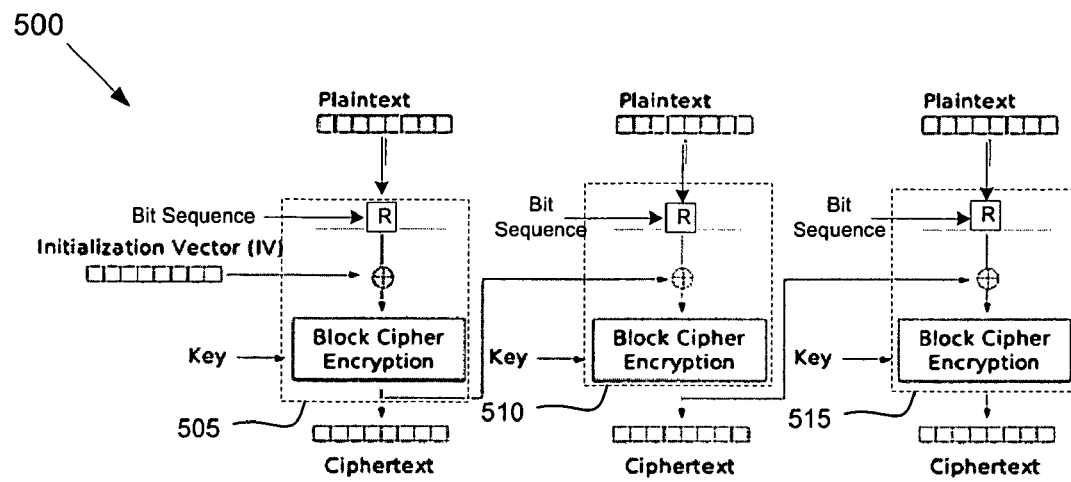
FIG. 5A illustrates a pictorial view of a data encryption process, in accordance with one embodiment of the present invention.

FIG. 5A illustrates a pictorial view of a data encryption process 500, in accordance with one embodiment of the present invention. In one embodiment, plaintext data is processed by encrypter/decrypter 215 of FIG. 2A to generate ciphertext.

In the illustrated embodiment, the encrypter/decrypter performs a first encryption round 505, a second encryption round 510, up to an nth encryption round 515 to generate an output of ciphertext blocks. In the first encryption round 505, a plaintext block is rotated by a number of bits represented by a secret bit sequence at rotation function R. An initialization vector is then XORed by the rotated plain text block. The output of the XOR operation is then processed by the block cipher to generate a first ciphertext block.

In the second encryption round 310, the encrypter/decrypter uses the rotation function R to rotate another plaintext block by a number of bits identified in another secret bit sequence. The ciphertext block generated in the first round 505 is then combined with the rotated plaintext block using an XOR operation. The output of the XOR operation is then processed by the block cipher to generate another ciphertext block. This process may continue until the nth round of encryption 515 has been completed, to generate a final output of ciphertext.

Figure 5B:
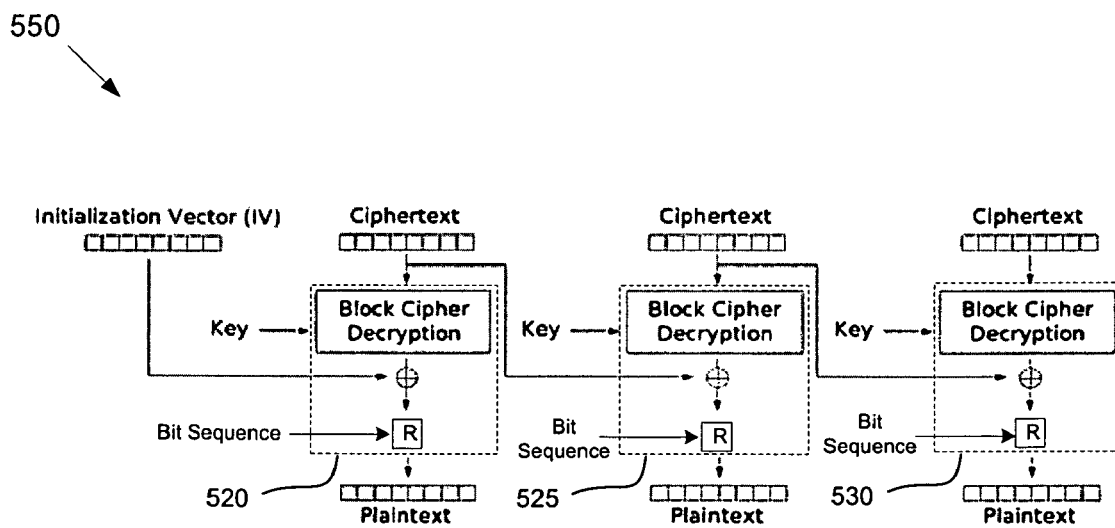
FIG. 5B illustrates a pictorial view of a data decryption process, in accordance with one embodiment of the present invention.

FIG. 5B illustrates a pictorial view of a data decryption process 550, in accordance with one embodiment of the present invention. The data decryption process is an inverse of the data encryption process illustrated in FIG. 5A. In one embodiment, the data is processed by encrypter/decrypter 215 of FIG. 2A.

Referring to FIG. 5B, data in the form of ciphertext is input into the encrypter/decrypter. The encrypter/decrypter can include up to n rounds of decryption (matching a number of rounds of encryption used to generate the ciphertext). To properly decrypt the ciphertext, the key, initialization vector and secret bit sequences used in decryption should correspond to those used for encryption. In the illustrated embodiment, the encrypter/decrypter performs a first decryption round 520, a second decryption round 525 through an nth decryption round 530.

In the first decryption round 520, the block of ciphertext generated during the first encryption round 505 is processed by the block cipher. The output is then combined with the initialization vector using the XOR operation. The rotation function then rotates the output of the XOR operation using the same secret bit sequence that was used to rotate the plaintext in the first round of encryption 505. During decryption, the rotation function may rotate data in the same direction or the opposite direction to the direction that it was rotated during encryption. The output of the rotation function is a first block of plaintext.

In the second decryption round 525, the ciphertext block generated during the second round 510 of encryption is processed by the block cipher. The output is then combined with the ciphertext block generated during the first encryption round 505 using the XOR operation. The rotation function then rotates the output of the XOR operation using the same secret bit sequence that was used to rotate the plaintext in the second round of encryption 510. This process may continue until the nth round of decryption 330 has been completed, to generate a final plaintext block.

The exemplary encryption and decryption processes shown above in FIG. 5A and FIG. 5B, respectively, illustrate application of a particular nonlinear mode of operation, in accordance with one embodiment of the present invention. In other embodiments, a rotation function may be applied to well known modes of operation to increase security of those modes of operation. For example, the rotation function may be added to a cipher feedback mode, output feedback mode, counter mode, and so one. The rotation function may also be applied to the mode of operation illustrated in FIGS. 3A and 3B.

Though the rotation function R is shown to rotate the plaintext before the XOR operation is performed during encryption (and therefore after the XOR operation is performed during decryption), the rotation function R may also be used to rotate an output of the XOR function during encryption (and thus to rotate an input to the XOR function during decryption). The rotation function may also be used to rotate the output of the block cipher during encryption (and thus the input of the block cipher during decryption).

Figure 6:
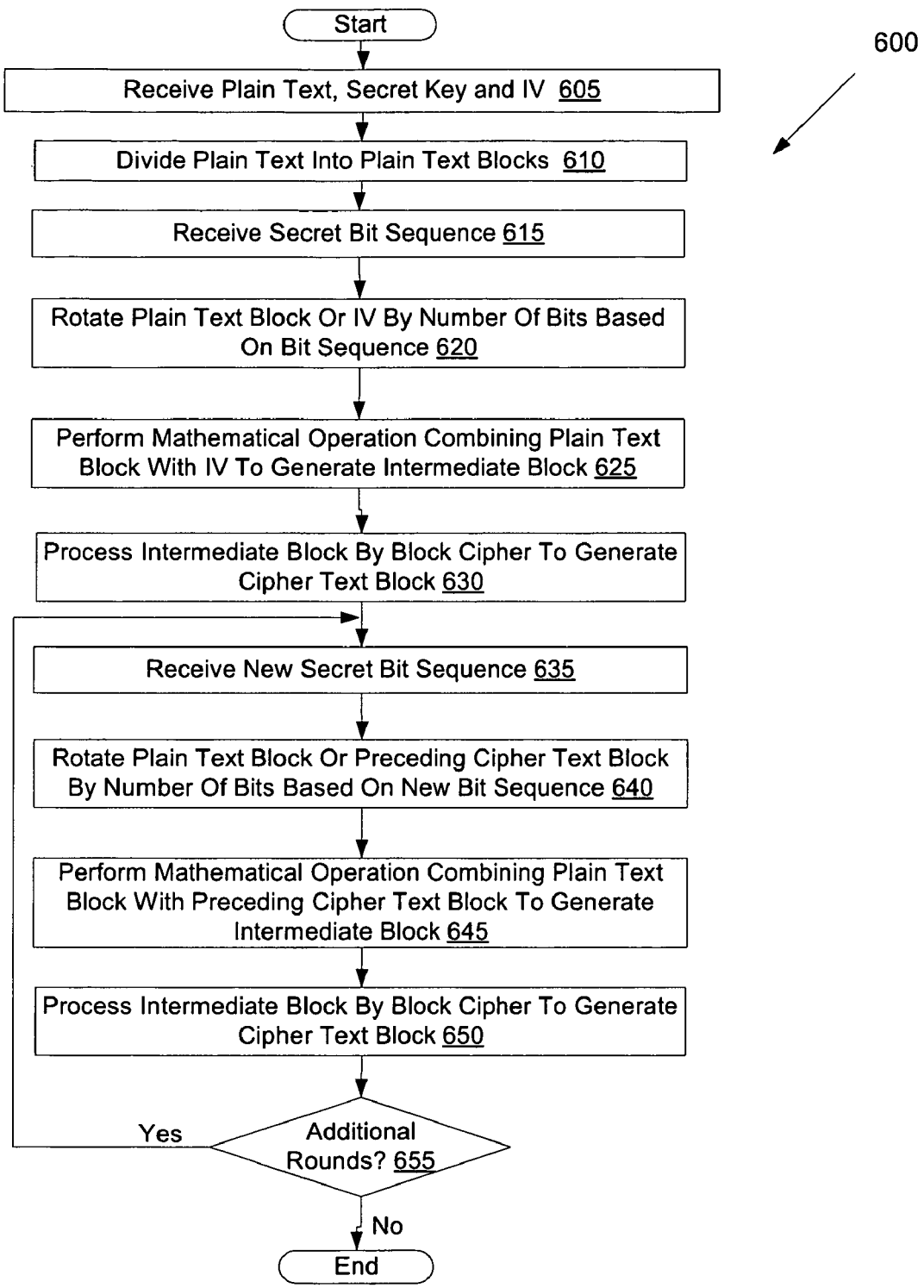
FIG. 6 illustrates a flow diagram of one embodiment for a method of encrypting data.

FIG. 6 illustrates a flow diagram of one embodiment for a method 600 of encrypting data. The method may be performed by processing logic that may comprise hardware (e.g., circuitry, dedicated logic, programmable logic, microcode, etc.), software (such as instructions run on a processing device), or a combination thereof. In one embodiment, method 600 is performed by encrypter/decrypter 215 of FIG. 2A.

Referring to FIG. 6, method 600 includes receiving plain text, a secret key and an initialization vector (operation 605). At operation 610, the plaintext is divided into multiple plaintext blocks, each of which is sized such that a block cipher can operate on it.

At operation 615, the encrypter/decrypter receives a secret bit sequence. In one embodiment, the secret bit sequence is received from a stream cipher. Alternatively, the encrypter/decrypter may compute the secret bit sequence from the initialization vector, the plain text and/or the secret key.

At operation 620, the encrypter/decrypter rotates the plaintext block or the initialization vector by a number of bits based on the secret bit sequence. At block 625, the encrypter/decrypter performs a mathematical operation combining the plaintext block with the initialization vector to generate an intermediate block. In one embodiment, the mathematical operation is an XOR operation. In another embodiment, the mathematical operation may be multiplication over a finite field of even characteristic, modulo a primitive polynomial. In such an embodiment, the encrypter/decrypter may receive the primitive polynomial before performing the mathematical operation. At operation 630, the intermediate block is processed by a block cipher to generate a ciphertext block.

At operation 635, a new secret bit sequence is received (or computed). At operation 640, the encrypter/decrypter rotates the plain text blocks or a preceding ciphertext block (e.g., the cipher text block generated at operation 630) by a number of bits based on the new bit sequence. At operation 645, the encrypter/decrypter performs a mathematical operation combining the plaintext block with the preceding ciphertext block to generate an intermediate block. At operation 650, the intermediate block is processed by a block cipher to generate a ciphertext block.

At operation 655, the encrypter/decrypter determines whether additional rounds of encryption need to be performed. Additional rounds of encryption need to be performed, for example, if there are remaining plaintext blocks. If additional rounds of encryption do need to be performed, the method returns to operation 635. Otherwise the method ends.

Though method 600 has been described with reference to encrypting data, method 600 may also be performed to decrypt data that has been encrypted using method 600. To decrypt data, ciphertext would be received rather than plaintext, and operations of 620, 625 and 630 would be performed in reverse, such that the operation 630 is performed, followed by the operation 625, and so on. Likewise, operations 640, 645 and 650 would also be reversed.

An example showing of one way to encrypt plain text using method 600 is detailed below, in accordance with one embodiment of the present invention. For the following example, the block size operated on by the block cipher is 8 bits, and three bit secret bit sequences are used to rotate blocks left during encipherment. The following example shows the encrypter/decrypter operating the block cipher in a counter mode of operation, with the counter value initialized to zero. In the example, the string "cat" (represented in hex as the ASCII values [63 61 74]) is encrypted with an initialization vector of [0x5c].

First, the initialization vector is appended to an output stream of cipher text blocks (so that the same initialization vector is used for decryption), making the output stream [5c]. A first secret bit sequence of [001] is obtained. The initialization vector [5c] is rotated left one bit to yield [b8], and XORed with the first plaintext block [63], as follows: [63]⊕[b8]= [db]. The result of the XOR operation [db] is then processed by the block cipher to yield [15], and appended to the output stream (now [5c 15]).

A new secret bit sequence [101] is then obtained and used to rotate the preceding ciphertext block [15] left by five bits, to yield [a2]. An XOR operation is then performed combining the rotated ciphertext block [a2] and the next plaintext block [61] to provide [61]⊕[a2]=[c3]. The result of the XOR operation is processed by the block cipher to yield [55], and then added to the output stream (now [5c 15 55]).

Another secret bit sequence [110] is then obtained and used to rotate the preceding ciphertext block [55] left by six bits, to yield [55]. An XOR operation is then performed combining the rotated ciphertext block [55] and the next plaintext block [74] to provide [74]⊕[55]=[21]. The result of the XOR operation is processed by the block cipher to yield [df], and then added to the output stream. The final ciphertext is represented by the output stream of [5c 15 55 df].

To decipher, you would decipher each block by the block cipher, and XOR it with the appropriately rotated previous block. The block [15] would be processed by the block cipher to obtain [db]. A first secret bit sequence [001] is then used to rotate the initialization vector [5c] left by 1 bit, to obtain [b8]. The rotated initialization vector [b8] is then XORed with the deciphered value to obtain [b8]⊕[db]=[63]. The next ciphertext block [55] is then deciphered by the block cipher to obtain [c3]. The next secret bit sequence [101] is then obtained and used to rotate the ciphertext block [15] left by five bits to obtain [a2]. The rotated ciphertext block [a2] is then XORed with the deciphered value[c3] to obtain [c3]⊕[a2]=[61]. Finally, the ciphertext block [df] is processed by the block cipher to obtain [21], the last secret bit sequence is obtained and used to rotate the ciphertext block [55] left by six bits to obtain [55], and the rotated ciphertext block is XORed with the deciphered value, as follows: [21]⊕[55]=[74]. The decrypted plaintext is then [63 61 74], the ASCII representation of the string "cat."

One potential issue with the above example is that if a block gets deleted from the middle of a message, none of the rest of the message can be deciphered without manually resynchronizing the bitstream source with the ciphertext message. This may be avoided by using an additional block of ciphertext as the basis for the secret bit sequences (e.g., by enciphering the block of ciphertext, and using some subset of the enciphered bits). Such a construction would use two block ciphers, which may use the same or a different secret key.

An example showing of another way to encrypt plain text using method 600, is detailed below, in accordance with one embodiment of the present invention. In the following example two block ciphers are used, a first block cipher I for encrypting the plaintext, and a second block cipher J for generating the secret bit sequences. An output of the second block cipher will provide a secret bit sequence having three bits by XORring the uppermost 3 and lowermost 3 bits of the output. The initial block to be enciphered by the second block cipher will be derived from the initialization vector by taking the binary NOT of the initialization vector To encipher [63 61 74], an initialization vector (IV) of [5c] is generated, and added to the output stream. The first block cipher I is initialized with the IV value, and the second block cipher J is initialized with the binary NOT of the IV value (so, I=5c, J=a3). Encipher J with the "keybits" key, obtaining [54]=01010100 binary, giving 6 as the bit rotation amount. Rotate I left by 6, obtaining [15]. XOR the plaintext block with the rotated ciphertext block to obtain [63]⊕[15]=[76]. Encipher the result (getting [ea]), and add it to the output stream (now [5c ea]). Set J=I (5c) and I=previous ciphertext (ea). Encipher J to get a bit rotation amount of 2 bits. Rotate I by 2, obtaining [d5]. XOR the rotated I and the next plaintext block, obtaining [d5]⊕[61]=[b4]. Encipher the result, adding it to the output stream (now [5c ea dc]). Set J=I (ea) and I=previous ciphertext [dc]. Encipher J to get a bit rotation amount of 2 bits. Rotate I by 2 to obtain [73]. XOR I and the ciphertext block to obtain [74]⊕[73]=[07]. Finally, encipher the result and add it to the output stream, which becomes [5c ea dc 6f].

This construction adds a work factor equal to 1 g(m)+1 bits to a known plaintext attack (and the same to a chosen plaintext or chosen ciphertext attack). Therefore, if you originally had a 128 bit key with a 64 bit block size, you increase your effective key length to 135 bits. This work factor increase is independent of the source for the rotation amounts (secret bit sequences), as long as it is securely secret. In one embodiment, the plaintext is rotated instead of, or in addition to, the feedback block (e.g., the preceding ciphertext block).

A stronger variant is to use multiple copies of the IV, rotated by different amounts, dependent on a secret key. For example, the block J could be enciphered, and the set bits could be used to select the appropriate rotations of I that are XORed with the plaintext block. This would direct the cipher operation to XOR the results of rotating I 0, 2, 3, ... 62 bits with the plaintext block before enciphering. This would be the equivalent of interpreting both I and the enciphered J as polynomials over GF(2), and multiplying them modulo$^{xm+1}$ (where m is the block size of the cipher). This operation can be done in hardware in constant time with a number of gates proportional to the square of the block size, or in time proportional to the block size, with a number of gates proportional to the block size. This construction increases the effective work of a known plaintext attack by m bits, making them as expensive as brute force, assuming the cipher used to encipher J is as strong as the cipher used to encipher the plaintext, and produces results that can't be correlated with the underlying block cipher. To provide maximum security, you shouldn't use the same key you're using for rotation bits for the key to your block cipher.

Figure 7:
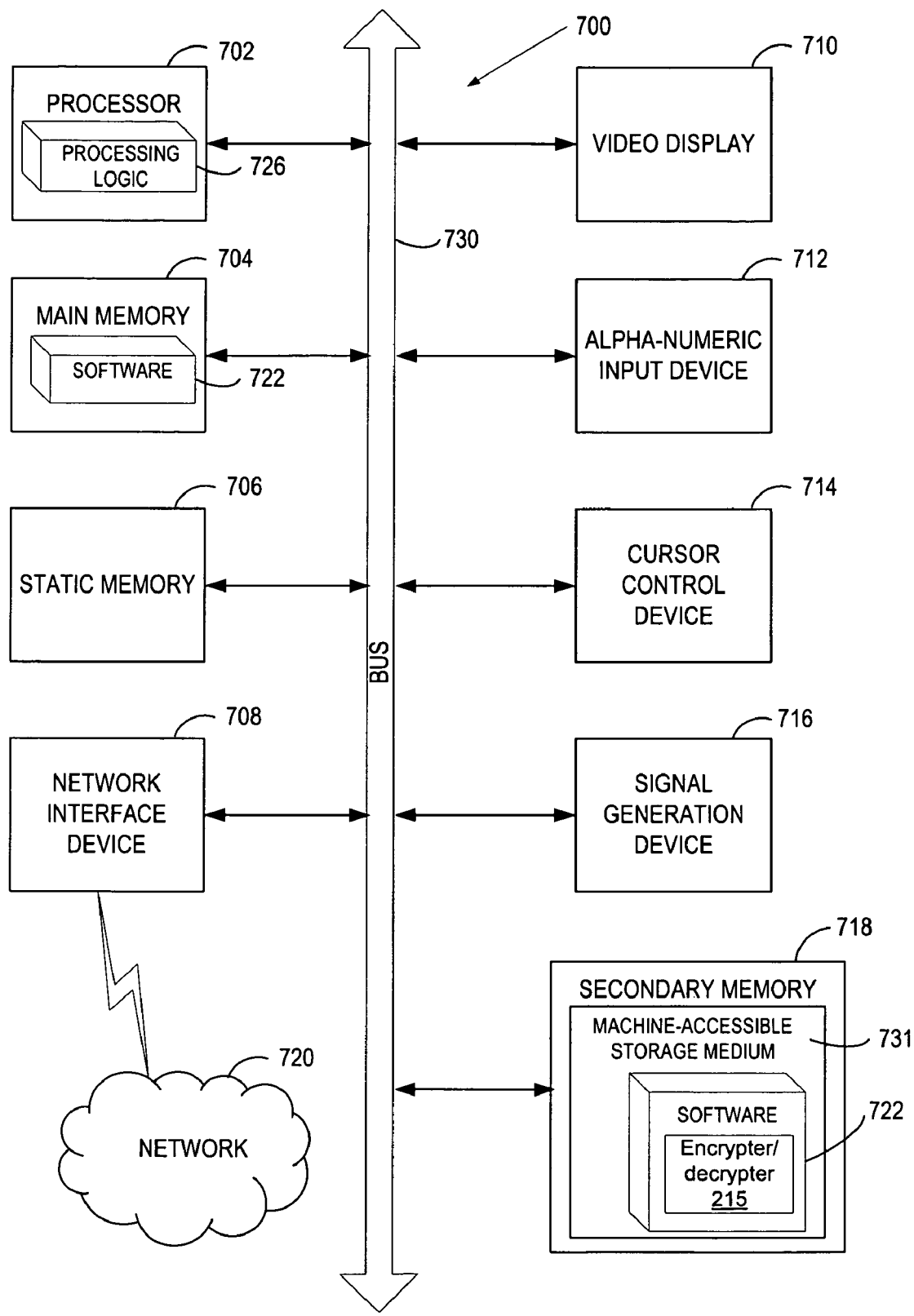
FIG. 7 illustrates a block diagram of an exemplary computer system, in accordance with one embodiment of the present invention.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 718 (e.g., a data storage device), which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The secondary memory 718 may include a machine-readable storage medium (or more specifically a computer-readable storage medium) 731 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-readable storage media. The software 722 may further be transmitted or received over a network 720 via the network interface device 708.

The machine-readable storage medium 731 may also be used to store the encrypter/decrypter 215 of FIG. 2A, and/or a software library containing methods that call the encrypter/decrypter 215. While the machine-readable storage medium 731 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method of securing data, comprising:
   dividing received plain text into a plurality of plain text blocks by a computing device executing a block cipher; and
   for each plain text block of the plurality of plain text blocks other than a first plain text block:
   determining a number of bits to rotate for at least one of the plain text block or a preceding cipher text block generated from a preceding plain text block based on at least one of a first secret bit sequence received from a stream cipher or a second secret bit sequence computed from a preceding cipher text block;
   rotating bits of at least one of the plain text block or the preceding cipher text block by the determined number of bits;
   multiplying the plain text block by the preceding cipher text block over a finite field of even characteristic, modulo a primitive polynomial that defines the finite field of even characteristic, to generate an intermediate block; and
   processing the intermediate block by the block cipher using a received secret key to generate a subsequent cipher text block, wherein the block cipher operates in a nonlinear feedback mode of operation.

2. The method of claim 1, further comprising:
   receiving an initialization vector;
   multiplying the initialization vector by the first plain text block of the plurality of plain text blocks over the finite field of even characteristic, modulo the primitive polynomial, to generate a first intermediate block; and
   processing the first intermediate block by the block cipher using the secret key to generate a first cipher text block.

3. The method of claim 1, further comprising:
   deriving the primitive polynomial from the secret key.

4. The method of claim 1, further comprising:
   if a cipher text block is a zero element of the finite field of even characteristic, replacing the cipher text block with a first secret block before performing the multiplication; and
   if the cipher text block is a multiplicative identity element of the finite field of even characteristic, replacing the cipher text block with a second secret block before performing the multiplication.

5. The method of claim 4, further comprising, if one or more consecutive plain text blocks are zero elements of the finite field of even characteristic:
   determining a count of the one or more plain text blocks;
   replacing the one or more plain text blocks with a third secret block; and
   generating a first additional output block indicating the count.

6. The method of claim 5, further comprising, if a plain text block matches the third secret block:
   resetting the count to zero; and
   generating a second additional output block indicating the count.

7. A method of securing data, comprising:
   dividing received plain text into a plurality of plain text blocks by a computing device executing a block cipher; and
   for each plain text block of the plurality of plain text blocks other than a first plain text block:
   determining a number of bits to rotate for at least one of the plain text block or a preceding cipher text block generated from a preceding plain text block based on at least one of a first secret bit sequence received from a stream cipher or a second secret bit sequence computed from a preceding cipher text block;
   rotating bits of at least one of the plain text block or the preceding cipher text block by the determined number of bits;
   performing a mathematical operation combining the plain text block with the preceding cipher text block to generate an intermediate block; and
   processing the intermediate block by the block cipher using a secret key to generate a subsequent cipher text block, wherein the block cipher operates in a nonlinear feedback mode of operation.

8. The method of claim 7, wherein the block cipher is an n-bit block cipher, the plain text is divided into n-bit plain text blocks, and the secret bit sequence includes lg(n) bits.

9. The method of claim 7, wherein computing the secret bit sequence comprises processing at least one of the preceding cipher text block or the preceding plain text block using a cryptographic hash function.

10. The method of claim 7, wherein the mathematical operation is multiplication over a finite field of even characteristic, modulo a primitive polynomial, the method further comprising:
receiving the primitive polynomial.

11. A non-transitory computer readable medium including instructions that, when executed by a processing system, cause the processing system to perform a method of securing data, comprising:
dividing received plain text into a plurality of plain text blocks; and
for each plain text block of the plurality of plain text blocks other than a first plain text block:
determining a number of bits to rotate for at least one of the plain text block or a preceding cipher text block generated from a preceding plain text block based on at least one of a first secret bit sequence received from a stream cipher or a second secret bit sequence computed from a preceding cipher text block;
rotating bits of at least one of the plain text block or the preceding cipher text block by the determined number of bits;
multiplying the plain text block by the preceding cipher text block over a finite field of even characteristic, modulo a primitive polynomial that defines the finite field of even characteristic, to generate an intermediate block; and
processing the intermediate block by a block cipher using a received secret key to generate a subsequent cipher text block, wherein the block cipher operates in a nonlinear feedback mode of operation.

12. The non-transitory computer readable medium of claim 11, the method further comprising:
receiving an initialization vector;
multiplying the initialization vector by the first plain text block of the plurality of plain text blocks over the finite field of even characteristic, modulo the primitive polynomial, to generate a first intermediate block; and
processing the first intermediate block by the block cipher using the secret key to generate a first cipher text block.

13. The non-transitory computer readable medium of claim 11, the method further comprising:
deriving the primitive polynomial from the secret key.

14. The non-transitory computer readable medium of claim 11, the method further comprising:
if a cipher text block is a zero element of the finite field of even characteristic, replacing the cipher text block with a first secret block before performing the multiplication; and
if the cipher text block is a multiplicative identity element of the finite field of even characteristic, replacing the cipher text block with a second secret block before performing the multiplication.

15. The non-transitory computer readable medium of claim 14, the method further comprising, if one or more consecutive plain text blocks are zero elements of the finite field of even characteristic:
determining a count of the one or more plain text blocks;
replacing the one or more plain text blocks with a third secret block; and
generating a first additional output block indicating the count.

16. The non-transitory computer readable medium of claim 15, the method further comprising, if a plain text block matches the third secret block:
resetting the count to zero; and
generating a second additional output block indicating the count.

17. A non-transitory computer readable medium including instructions that, when executed by a processing system, cause the processing system to perform a method of securing data, comprising:
dividing received plain text into a plurality of plain text blocks; and
for each plain text block of the plurality of plain text blocks other than a first plain text block:
determining a number of bits to rotate for at least one of the plain text block or a preceding cipher text block generated from a preceding plain text block based on at least one of a first secret bit sequence received from a stream cipher or a second secret bit sequence computed from a preceding cipher text block;
rotating bits of at least one of the plain text block or the preceding cipher text block by the determined number of bits;
performing a mathematical operation combining the plain text block with the preceding cipher text block to generate an intermediate block; and
processing the intermediate block by a block cipher using a received secret key to generate a subsequent cipher text block, wherein the block cipher operates in a nonlinear feedback mode of operation.

18. The non-transitory computer readable medium of claim 17, wherein the block cipher is an n-bit block cipher, the plain text is divided into n-bit plain text blocks, and the secret bit sequence includes $\lg(n)$ bits.

19. The non-transitory computer readable medium of claim 17, wherein computing the secret bit sequence comprises processing at least one of the preceding cipher text block or the preceding plain text block using a cryptographic hash function.

20. The non-transitory computer readable medium of claim 17, wherein the mathematical operation is multiplication over a finite field of even characteristic, modulo a primitive polynomial, the method further comprising:
receiving the primitive polynomial.

21. A block cipher encryption system comprising:
a memory to store instructions for a block cipher; and
a processing device to execute the instructions, wherein the instructions cause the processing device to:
divide received plain text into a plurality of plain text blocks; and
for each plain text block of the plurality of plain text blocks other than a first plain text block:
determine a number of bits to rotate for at least one of the plain text block or a preceding cipher text block generated from a preceding plain text block based on at least one of a first secret bit sequence received from a stream cipher or a second secret bit sequence computed from a preceding cipher text block;
rotate bits of at least one of the plain text block or the preceding cipher text block by the determined number of bits;
perform a mathematical operation combining the plain text block with the preceding cipher text block to generate an intermediate block; and
process the intermediate block by the block cipher using a received secret key to generate a subsequent cipher text block, wherein the block cipher operates in a nonlinear feedback mode of operation.

22. The block cipher encryption system of claim 21, further comprising the instructions to cause the processing device to:

receive a primitive polynomial that defines a finite field of even characteristic; and for each plain text block other than the first plain text block, multiply the plain text block by the preceding cipher text block over the finite field of even characteristic, modulo the primitive polynomial.

23. The block cipher encryption system of claim 22, further comprising the instructions to cause the processing device to:

receive an initialization vector;

multiply the initialization vector by a first plain text block of the plurality of plain text blocks over the finite field of even characteristic, modulo the primitive polynomial, to generate a first intermediate block; and process the first intermediate block using the secret key to generate a first cipher text block at a first round of encryption.

24. The block cipher encryption system of claim 22, further comprising the instructions to cause the processing device to:

replace a cipher text block with a first secret block before performing the multiplication if the cipher text block is a zero element of the finite field of even characteristic; and replace the cipher text block with a second secret block before performing the multiplication if the cipher text block is a multiplicative identity element of the finite field of even characteristic.

25. The block cipher encryption system of claim 24, further comprising the instructions to cause the processing device to perform the following if one or more consecutive plain text blocks are zero elements of the finite field of even characteristic;

determine a count of the one or more plain text blocks;

replace the one or more plain text blocks with a third secret block; and generate a first additional output block indicating the count.

26. The block cipher encryption system of claim 25, further comprising the instructions to cause the processing device to reset the count to zero, and to generate a second additional output block indicating the count if the plain text block matches the third secret block.

27. The block cipher encryption system of claim 21, wherein computing the secret bit sequence comprises processing at least one of the preceding cipher text block or the preceding plain text block using a cryptographic hash function.

* * * * *